United States Patent
Warfield

(10) Patent No.: US 7,469,456 B2
(45) Date of Patent: Dec. 30, 2008

(54) TOOL FOR SETTING EXPANSION BOLTS

(75) Inventor: Donald B. Warfield, Woodbine, MD (US)

(73) Assignee: BP Corporation North America Inc., Warrenville, IL (US)

( * ) Notice: Subject to any disclaimer, the term of this patent is extended or adjusted under 35 U.S.C. 154(b) by 0 days.

(21) Appl. No.: 10/845,637

(22) Filed: May 14, 2004

(65) Prior Publication Data
US 2004/0244179 A1 Dec. 9, 2004

Related U.S. Application Data

(60) Provisional application No. 60/471,320, filed on May 16, 2003.

(51) Int. Cl.
*B23P 19/04* (2006.01)
*B23P 11/00* (2006.01)

(52) U.S. Cl. ............... 29/268; 29/267; 29/282; 29/525.11; 254/21; 254/18; 81/44

(58) Field of Classification Search .......... 29/268, 29/269, 525.11, 267, 278, 283, 283.5, 282; 254/21, 22, 18; 81/44
See application file for complete search history.

(56) References Cited

U.S. PATENT DOCUMENTS

| | | | |
|---|---|---|---|
| 3,961,410 A | 6/1976 | Reed | 29/256 |
| 4,007,795 A | 2/1977 | Gawron et al. | 173/50 |
| 4,180,958 A | 1/1980 | Brody | 52/747 |
| 4,265,008 A | 5/1981 | Lippacher et al. | 29/240 |
| 4,311,069 A * | 1/1982 | Walker | 254/245 |
| 4,393,638 A | 7/1983 | Sell et al. | 52/704 |
| 4,462,240 A * | 7/1984 | Yamamoto | 72/391.8 |
| 4,502,554 A | 3/1985 | Jones | 175/285 |
| 4,536,115 A | 8/1985 | Helderman | 411/17 |
| 4,586,573 A | 5/1986 | Jones | 175/285 |
| 4,627,140 A | 12/1986 | Davis | 29/264 |
| 4,635,337 A | 1/1987 | Helderman | |
| 4,867,249 A | 9/1989 | Watkins, Jr. et al. | 173/29 |
| 4,890,779 A | 1/1990 | Giannuzzi | 227/139 |
| 4,899,431 A | 2/1990 | Borntrager | 29/244 |
| 4,932,638 A * | 6/1990 | Chen | 269/6 |
| 4,958,510 A * | 9/1990 | Denham et al. | 72/391.4 |
| 5,569,007 A | 10/1996 | Abraham | 411/82 |
| 5,644,889 A | 7/1997 | Getz | 52/713 |
| 5,979,913 A | 11/1999 | Kosik et al. | 279/145 |
| 6,108,885 A * | 8/2000 | Cox | 29/268 |
| 6,473,955 B1 * | 11/2002 | Huang | 29/268 |
| 6,516,505 B1 * | 2/2003 | Taylor | 29/268 |
| 7,373,709 B2 * | 5/2008 | Fernando et al. | 29/525.01 |

* cited by examiner

*Primary Examiner*—Essama Omgba
(74) *Attorney, Agent, or Firm*—Thomas E. Nemo

(57) ABSTRACT

A tool and method for installing an expansion bolt in a remote location where the expansion bolt is not readily accessible. The tool is comprised of a housing having a rod with a puller element on one end slidably mounted in the housing. A barrel is attached to and extends from the front of the housing. The headless screw of an expansion bolt is loosely threaded into the puller element and the barrel of the tool and the bolt are lowered until the expandable anchor on the screw is in or below a hole in a remote support structure. A ratchet in the housing moves the puller within the housing to pull the screw upward while the lower end of the barrel abuts and holds the flange on the anchor portion against the support structure to set the expandable anchor.

7 Claims, 3 Drawing Sheets

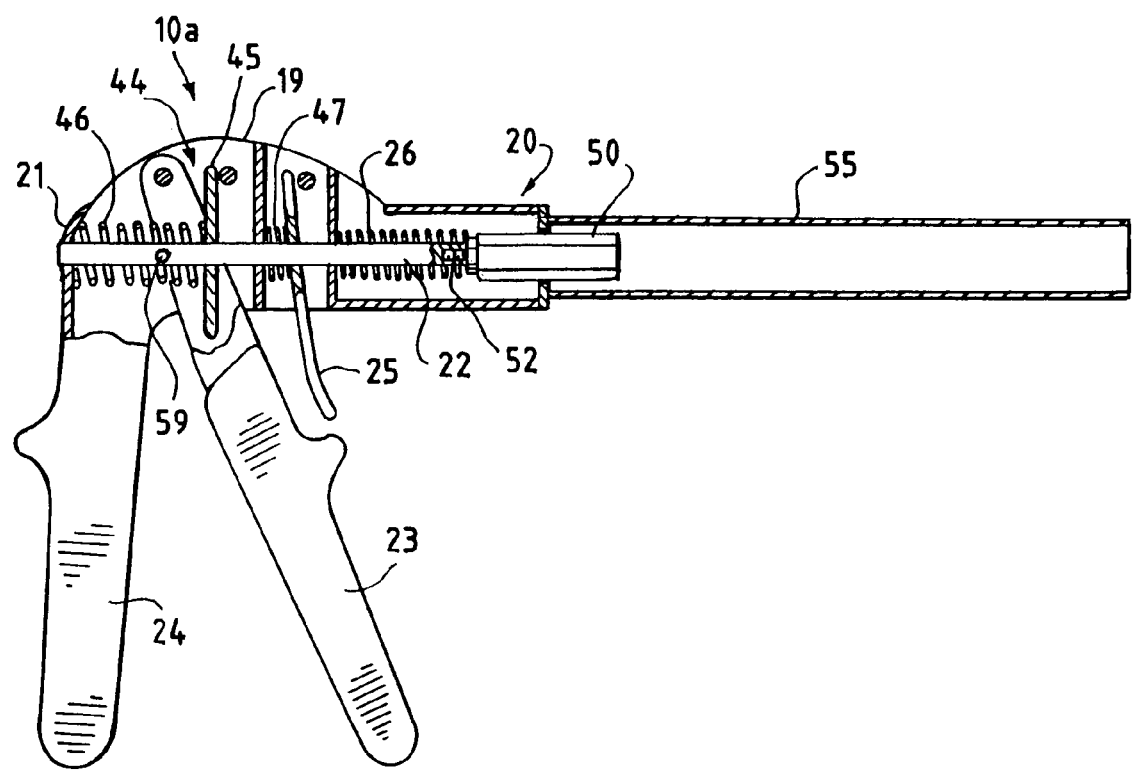

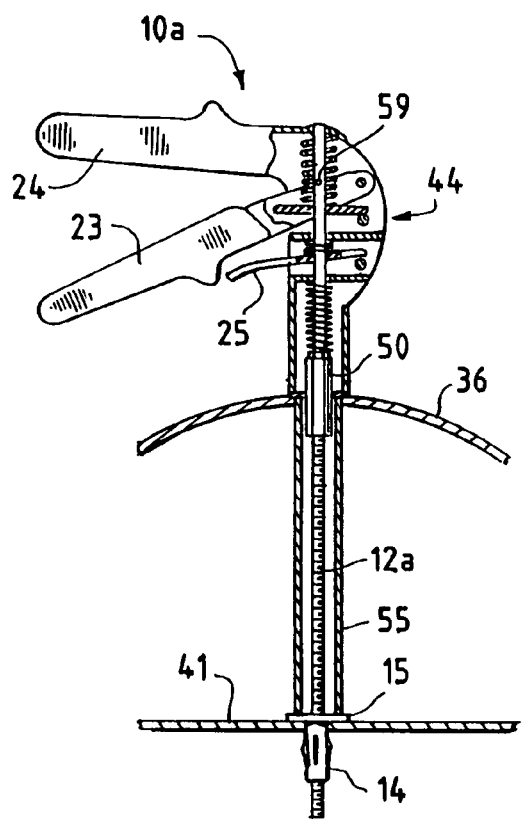
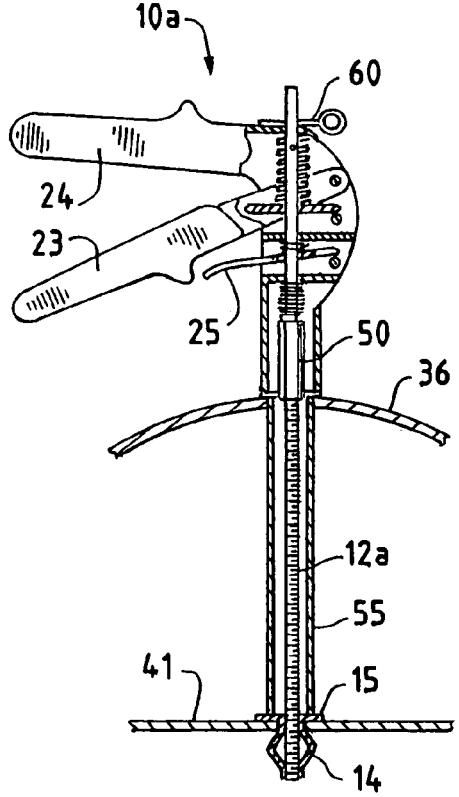
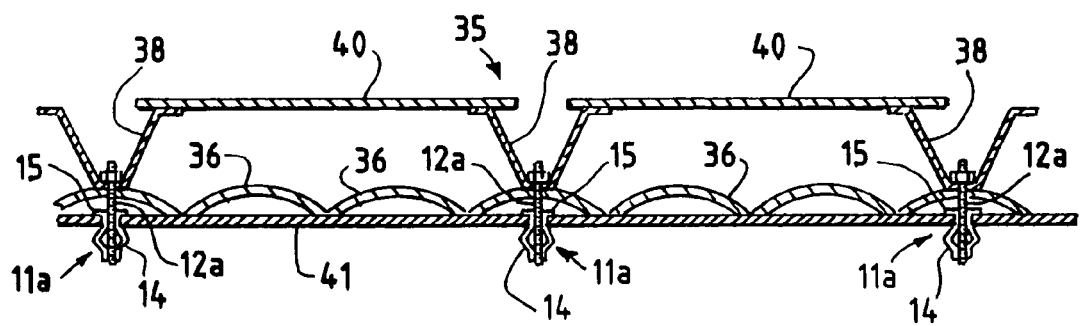

TOOL FOR SETTING EXPANSION BOLTS

This application claims the benefit of U.S. Provisional Patent Application 60/471,320 filed on May 16, 2004.

FIELD OF THE INVENTION

The present invention relates to tool for setting expansion bolts and in one of its aspects relates to tool for setting expansion bolts in remote locations where the bolts are not readily accessible.

BACKGROUND OF THE INVENTION

An expansion or anchor bolt (hereinafter referred to as "expansion bolt") is a well-known type of fastener that is used for securing objects to a board-like, support structure (e.g. decking, sheathing, wallboard, or the like). One of the most common of this type of fastener is one which has an expandable anchor mounted on the lower end of an elongated, central threaded member (i.e. bolt, screw, etc.; hereinafter referred to as "screw").

To secure this type of fastener in place, a hole is drilled through the support structure (e.g. board) and the lower end of the expansion bolt is passed through the hole until the lower expandable portion of the anchor lies in or is completely below the board. When the bolt is so positioned, a flange on the top of the anchor will engage the top surface of the board and the upper end of the screw will extend up through the hole and extend above the board. The upper end of the screw is then gripped and pulled outward from the upper surface of the board. This movement causes the anchor to expand below the board thereby anchoring the expansion bolt in place. An object can then be mounted onto the exposed portion of the screw of the now anchored, expansion bolt to secure the object on the board.

Various tools are used to set this type of expansion bolt. For example, in some instances, simple pliers or like tools have been used to grip and pull the upper end of the screw to set the bolt. As will be recognized, such gripping tools are inefficient, especially where a relatively large number of bolts need to be installed, and can cause serious damage to the threads on the screw.

Recently, specialized tools have been developed for quickly and efficiently setting this type of expansion bolt without causing damage to the bolt. More specifically, relatively small, hand-held "guns" are commercially available which loosely engage the head of the screw of an expansion bolt and then pull the screw outwardly to quickly set the bolt without damaging the screw. These guns are basically comprised of a housing having a pair of handles, which when squeezed, advance the screw away from the upper surface of the board to set the anchor in or below the board.

One such tool or gun is that which is disclosed in U.S. Pat. No. 4,932,638, issued Jun. 12, 1990. The tool disclosed therein is comprised of a housing having a rod slidably positioned therein. A slide element is attached to the forward end of the rod and has a slot that is adapted to loosely receive the head of the screw of an expansion bolt. A ratcheting mechanism is actuated by squeezing a pair of handles to move the rod away from the upper surface of the support structure to which the expansion bolt is to be attached.

Once the rod has moved sufficiently to set the anchor on the expansion bolt, the head of the screw is removed from the slide element and a trigger mechanism in the gun is pulled to release the rod. Springs in the housing return the rod and slide element to their original positions within the housing and the gun is now ready for setting another expansion bolt.

The prior art tool of the above-cited reference works well in most routine installations where the expansion bolt is readily accessible and where the screw of the expansion bolt has a head that easily engages the slot in the slide element of the tool. However, there are other installations that require the setting of a relatively large number of expansion bolts where these known, prior art guns can not be used; e.g. where (a) remote locations where the anchor portion of the expansion bolt is not readily accessible to the gun and (b) the screw of the expansion bolt is threaded along its entire length (i.e. has no head).

An example of such an installation is one that involves the mounting of solar energy arrays onto certain types of roofs (e.g. cement, ceramic, and like tiles such as "Spanish tile" roofs). In such installations, supports for the array must be mounted onto the tops of the arched or curved tiles, themselves. This presents a real problem since this type of tile is not a reliable support structure to which the necessary expansion bolts can be anchored. Due to the relatively fragile nature of such ceramic or cement tiles, the forces exerted by the anchors on the tiles can easily crack and seriously damage the tiles during the operational life of the array which is obviously unacceptable.

In installations of this type, it is neither practical nor economical to remove and then replace the affected tiles to install the necessary expansion bolts. Accordingly, to install such solar arrays efficiently in the field, an installer must be able to quickly and effectively set the required, relatively large number of expansion bolts without having to remove and replace tiles on the roof.

Recently, a novel technique has been developed for installing solar arrays onto these types of arched tile roofs which does not require the removal of any of the tiles. Basically, aligned holes are drilled through both a selected tile and the decking below on which the tile is mounted. The decking, e.g. plywood, may actually be up to 6 inches below the top of the arched surface of the arched tile. An expansion bolt is lowered through the aligned holes and the anchor on the expansion bolt is set below the lower surface of the decking. The screw of the expansion bolt extends upward through the hole in the tile and a support for the solar array is mounted thereon. For a more detailed description of such a technique, see co-pending and co-assigned U.S. Provisional Patent Application Ser. No. 60/463,359, filed Apr. 16, 2003, which is incorporated herein by reference in its entirety.

In such installations, the expandable portion of the anchor lies below the under surface of the decking while a flange on the anchor engages the top surface of the decking to keep the anchor from being pulled through the hole. The upper end of the screw of the expansion bolt is headless and extends upward through and above the drilled hole in the tile. In order to set the expansion bolt, the upper end of the headless screw must be gripped without damaging the threads on the screw. Further, the screw must then be pulled upward away from the tile without damaging the tile, itself. Still further the flange on the top of the anchor must be held in contact with the top of the decking as the screw is pulled upward in order to create the reactant forces necessary to set the anchor. It can readily be seen that none of the known prior art tools are capable of performing all of the necessary functions to set expansion bolts in such a remote environment.

SUMMARY OF THE INVENTION

The present invention provides a tool and a method for installing an expansion bolt in a remote location where the expansion bolt is not readily accessible. Basically, the tool is capable of lowering the expansion bolt through aligned openings (e.g. openings in a arched tile and in the decking below) and then pulling the bolt upward to set the anchor without damaging either the threads on the bolt or the uppermost surface involved (e.g. upper surface of the arched tile).

More specifically, the tool of the present invention is capable of setting an expansion bolt in a remote location when the expansion bolt is comprised of a central threaded element (e.g. headless screw) having an expandable anchor portion on the lower end thereof. The tool is comprised of a housing having a rod slidably mounted therein. A puller element is attached to the front end of the rod and is adapted to receive the upper end of the screw of the expansion bolt. Preferably, the screw is attached to the puller element by loosely threading the upper end of the screw into a threaded bore within the puller element.

A ratchet means in the housing, which is actuated by squeezing a pair of handles, moves the rod towards the back of the housing in increments until the screw has moved sufficiently to set the anchor portion of the expansion bolt. An elongated barrel extends outward from a faceplate which, in turn, is secured to the front of the housing. The barrel surrounds the expansion bolt and is of a sufficient length to abut the flange on the anchor portion when the bolt is attached to the puller element and the expansion bolt is in position to be set at the remote location.

In a typical installation using the present tool (e.g. setting expansion bolts on an arched tile roof), aligned holes are drilled through the tile and the decking below. The upper end of the headless screw of an expansion bolt is threaded into the puller element of the tool and the barrel on the tool abuts the flange on the anchor portion. The barrel of the tool and the attached expansion bolt is then lowered through the aligned holes until the anchor portion of the bolt lies in or below the decking and the flange on the anchor portion lies on the upper surface of the decking.

The ratchet means is actuated to move the puller element upward in a direction away from the decking to thereby move the screw upward and set the anchor portion of the expansion bolt. The upper end of the screw is then unthreaded from the puller element and the rod is released within the housing of the tool to return the puller element to its original position. The tool is now ready to set the next expansion bolt.

BRIEF DESCRIPTION OF THE DRAWINGS

The actual construction operation, and apparent advantages of the present invention will be better understood by referring to the drawings, not necessarily to scale, in which like numerals identify like parts and in which:

FIG. 4 is a side view, partly in section, of the expansion bolt setting tool of the present invention;

FIG. 5 is a sectional view of the tool of FIG. 4 in first position to set an expansion bolt in the roof of FIG. 5;

FIG. 6 is a sectional view similar to FIG. 6 with the tool of FIG. 4 in a second position wherein the anchor portion of the expansion bolt is set; and FIG. 7 is a frontal, sectional view of a solar array installed on a tile roof using the expansion bolt setting tool of FIG. 4.

While the invention will be described in connection with its preferred embodiments, it will be understood that this invention is not limited thereto. On the contrary, the invention is intended to cover all alternatives, modifications, and equivalents that may be included within the spirit and scope of the invention, as defined by the appended claims.

DETAILED DESCRIPTION OF THE INVENTION

Figure 1:
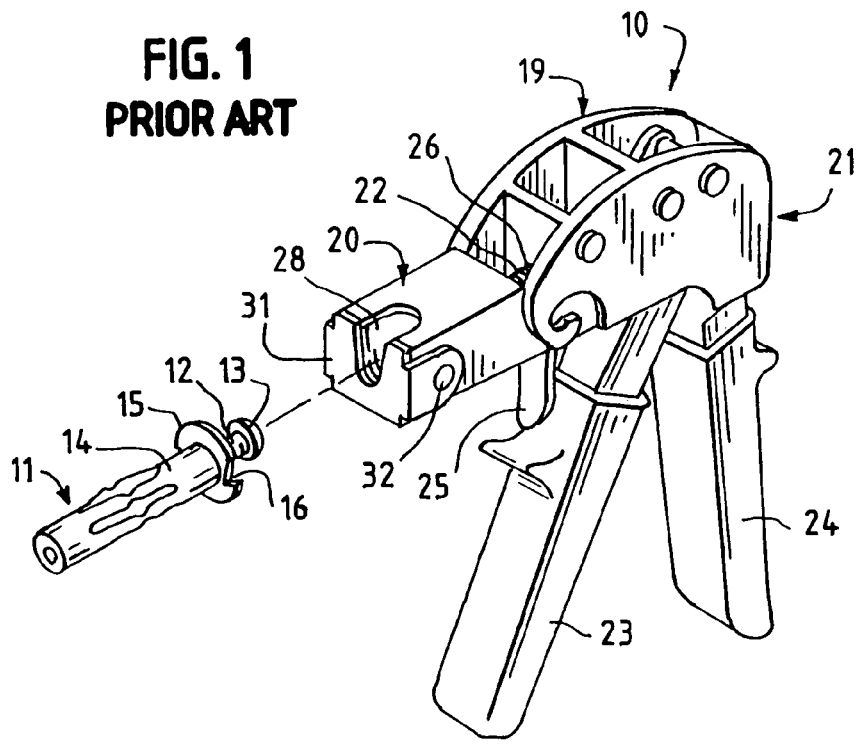
FIG. 1 is a perspective view of a prior art, expansion bolt setting tool and a common expansion bolt.

Referring now to the drawings, FIG. 1 illustrates a prior art, commercially available, tool 10 designed specifically for setting a common expansion bolt fastener 11. As will be recognized, expansion bolt 11 is of the type that is used to fasten objects to a surface such as a wallboard or the like. Bolt 11 is basically comprised of a central threaded element that is typically a screw 12 having a head 13 on the upper end thereof. Screw 12 is threaded into the lower end of expandable anchor portion 14, which, in turn, has a flange 15 with cleats 16 at its upper end. As will be understood, anchor portion 14 will expand outward from the screw as screw 12 is pulled upward towards flange 15.

The prior art expansion bolt setting tool or gun 10 (FIG. 1) is comprised of a housing 19 having a front portion 20 and a back 21. A rod 22 is slidably mounted for longitudinal movement within the housing. A ratchet mechanism (not visible in FIG. 1 but which will be described in more detail below), is positioned in the housing and is actuated by squeezing handles 23, 24 together. With each squeeze of the handles, the ratchet mechanism moves rod 22 one increment towards the back of the housing 19 until maximum movement of the rod is achieved (e.g. three increments). Once the rod has been moved the desired distance within the housing to set anchor portion 14, a trigger mechanism 25 is actuated to release the rod and springs (only one 26 shown in FIG. 1) returning the rod to its original position.

Figure 2:
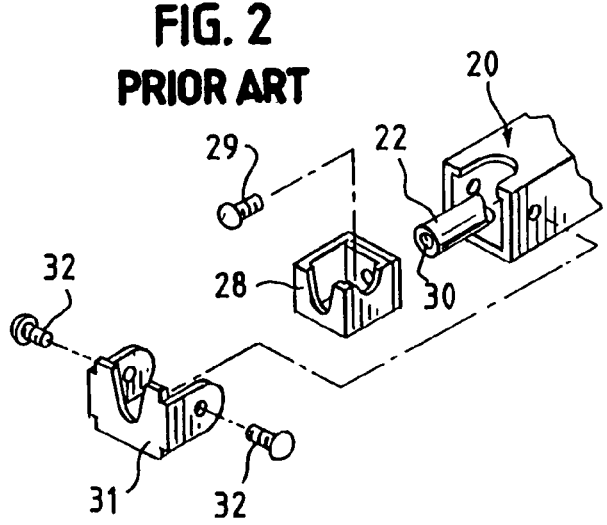
FIG. 2 is a perspective, exploded view of the nose portion of the prior art expansion bolt setting tool of FIG. 1.
Figure 3:
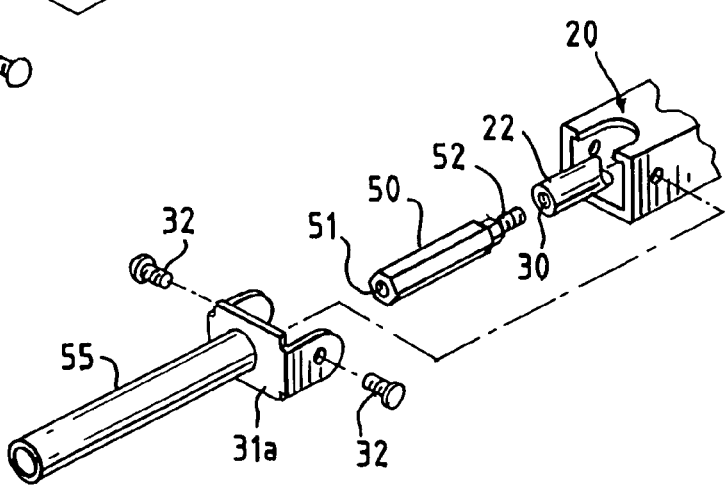
FIG. 3 is a perspective, exploded view of the nose portion of the expansion bolt setting tool in accordance with the present invention.

Referring now to FIG. 2, the front portion 20 of the tool 10 of FIG. 1 is shown in an exploded view. A slotted slide element 28 is slidably mounted within the front portion and is adapted to receive the head 13 of screw 12 of expansion bolt 11. Slide element 28 is connected to the front end of rod 22 by a screw 29 which threads into the threaded bore 30 of rod 22. Slotted faceplate 31 is secured to the front portion 20 by screws 32 or the like to limit the forward movement of slide element 28 within the housing 19.

To install an expansion bolt 11 with tool 10, a hole is drilled into a support structure (i.e. a board or the like—not shown) and the bolt is pushed through the hole until flange 15 and cleats 16 rest on the upper surface of the board. Head 13 of screw 12 is positioned into the slotted slide element 28 and handles 23, 24 are squeezed to move rod 22, hence the slide element, towards the back 21 of housing 19. This movement pulls the screw 12 away from the board to set the anchor portion 14 beneath or within the board as will be understood in the art. The head of the screw is then removed from the slide element and trigger 25 is pulled to release the spring-biased rod 22 to allow it to return to its original position. The tool 10 is now ready to set another expansion bolt. The description of tool and its operation up to this point is identical to that disclosed in U.S. Pat. No. 4,932,638, issued Jun. 12, 1990; this patent being incorporated herein by reference in its entirety.

While the tool 10 has been used in setting commercially available expansion bolts, there are some installations where this prior art tool cannot be used. For example, a method has recently been devised for mounting a solar energy array 35 (FIG. 7) onto the roof of a dwelling or like building which can use expansion bolts 11*a* to secure the support structure to the roof. This is especially true where the roof is covered with curved or arched tiles such as ceramic or concrete tiles 36 (only some numbered for clarity) as illustrated in FIG. 7. The support structure (channel pans 38) for the array is affixed onto the surface of these tiles 36 before the solar modules 40 can be attached thereto.

Due to the relative brittle nature of tiles 36, it is not practical to use expansion bolts to attach the pans 38 directly onto the surface of the tiles since the normal "wear and tear" exerted on these connections will likely crack or otherwise damage the tiles during the operational life of the array. Accordingly, it has been found that it is much more preferable to drill aligned holes through both a tile 36 and the decking 41 on which the tiles are secured. An expansion bolt 11*a* is then inserted through the holes and the anchor portion 14 is set below the decking 41 to hold the bolt 11*a* in place. The threaded central element of bolt 11*a* is a headless, elongated screw 12*a* having a length sufficient to extend above tile 36 when the anchor portion 14 is set below the decking 41. For a more detailed description for mounting such an array, reference is again made to co-pending and co-assigned U.S. Provisional Patent Application Ser. No. 60/463,359, filed Apr. 16, 2003.

In accordance with the present invention, there is provided a tool 10*a* which is capable of quickly and easily setting expansion bolts such as 11*a* disclosed above which are not readily accessible. Tool 10*a* (FIGS. 3-6) is comprised of a housing 19 and ratchet mechanism 44 which moves rod 22 towards the back of housing 19 when handles 23, 24 are squeezed together. Briefly, ratchet mechanism 44 (FIG. 4) is comprised of a ratchet plate 45 that has an opening therethrough, through which rod 22 passes. When plate 45 is rotated towards the back 21 of housing 19 by handle 23, the opening in plate 45 becomes skewed slightly with relation to rod 22 thereby causing the plate 45 to grip the rod and move the rod rearward towards the back of the housing.

Rod 22 also passes through an opening in trigger or holding plate 25. Plate 25 is normally biased by spring 47 to a position wherein the opening through plate 25 is slightly skewed with respect to rod 22 so the plate will grip and hold the rod against movement in housing 19. When rod 22 moves towards the back of the housing by handle 23, trigger plate 25 is rotated by its engagement with the rod until the opening through plate 25 becomes aligned with rod 22 thereby allowing the rod to move therethrough. Once handle 23 is released, spring 46 moves it back to its original position and spring 47 moves trigger plate 25 back to its original position to again grip and hold rod 22.

When rod 22 has completed its travel, trigger 25 is pulled to align the opening therein with the rod 22 thereby releasing the rod whereupon spring 26 moves the rod forward to its original position. While the ratchet mechanism 44, as described above, is identical to that shown in U.S. Pat. No. 4,932,638 which, in turn, has been incorporated herein by reference, it should be realized that other ratchet mechanisms can be used in tool 10*a* to move rod 22; e.g. mechanisms similar to those used in commercial caulking guns, etc.

In accordance with the present invention, tool 10*a* includes a puller sleeve 50 that preferably has a threaded bore 51 therethrough. One end of a headless screw 12*a* is threaded into the bore 51 of sleeve 50 and the other end 52 of sleeve 50 is threaded into bore 30 in rod 22 to thereby connect the sleeve to the end of rod 22. Spring 26 engages sleeve 50 (FIG. 4) and normally biases the sleeve towards the front of housing 19. A length of a cylindrical element or barrel 55 is affixed to the outer surface of face plate 31*a* which, in turn, is secured to the front portion 20 of housing 19 by screws 32 or the like. The length of barrel 55 may vary, depending on the particular installation involved which will be evident from the following description.

To better illustrate the features of the present tool 10*a*, a typical installation using this tool will now be set forth. Again referring to FIG. 7, solar array 35 is to be installed on a roof covered with arched tiles 36. First, using preformed holes in the bottoms of support pans 38, aligned holes are drilled through respective tiles 36 and decking 41 which, in turn, may lie up to 6 inches or so below the upper curved surface of the tile.

Next, the upper end of a headless screw 12*a* of an expansion bolt 11*a* is loosely threaded (2-3 revolutions) into bore 51 of puller element 50. The length of screw 12*a* is such that when it is threaded into puller element 50, the flange 15 on the anchor portion will abut the lower end of barrel 55 and the screw will be long enough to extend above the upper surface of the tile when the anchor portion is set. Bolt 11*a* and the surrounding barrel 55 of tool 10*a* are then lowered through the opening in tile 36 until the anchor portion 14 of bolt 11*a* passes through the opening in decking 41 and flange 15 on the anchor rests on the upper surface of the decking (FIG. 5).

Handle 23 is now squeezed toward handle 24 so that ratchet mechanism 44 moves rod 22 towards the back 21 of housing 19. This also moves the attached puller element 50 and headless screw 12*a* upward while the lower end of barrel 55 reacts against flange 15 to hold the anchor in place and to keep it from being pulled out of the opening in the decking. This upward movement of screw 12*a* expands and sets anchor portion 14 below decking 41 (FIG. 6), as will be understood in the art. A pin 60 or the like is inserted through an opening 59 in the upper portion of rod 22 to aid in unthreading the screw 12*a* from the puller element 50 after the anchor has been set. Trigger plate 25 is then released and the tool 10*a* is now ready to set the next expansion bolt 11*a*. Although FIGS. 3-6 show puller element 50 and rod 22 as separate elements so that puller 50 can be attached to rod 22, it is to be understood that puller element 50 and rod 22 can be one piece.

Also, faceplate 31*a* with barrel 55 attached and puller element 50 can be packaged and marketed as a kit for modifying commercially available expansion bolt tools such as that shown in FIG. 1.

U.S. Provisional Patent Application 60/471,320, filed on May 16, 2004, is incorporated herein by reference in its entirety.

What is claimed is:

1. A tool adapted for setting an expansion bolt which is not readily accessible, wherein the expansion bolt to be set is comprised of a central threaded member having an expandable anchor portion on the lower end thereof, the anchor portion having a flange on the upper end thereof, said tool comprising:

a housing having a front and a back;

a rod having a front end and a back end slidably mounted in said housing between said front and said back of said housing, said rod having a hole there-through adapted to receive a locking pin when disposed behind said back of said housing;

a means in said housing for moving said rod towards the back of said housing and thereby position said hole behind said housing;

a puller element attached at one end to said front end of said rod; said puller element being adapted to be releasably attached at its other end to the upper end of the threaded member of the expansion bolt;

and a barrel attached to the front end of said housing and extending longitudinally therefrom, said barrel sized to surround the threaded member of the expansion bolt when the threaded member of the bolt is attached to said puller member and said barrel being of a length sufficient to abut the flange of the anchor portion when the expansion bolt is in position to be set and the anchor is not readily accessible; and a face plate removable attached to said front of said housing; and said barrel being attached to said face plate.

2. The tool of claim 1 wherein said puller element has a threaded bore there-through which is adapted to receive the upper end of the threaded member of the expansion bolt.

3. The tool of claim 2 wherein said means for moving said rod comprises: a ratchet means for moving said rod towards said back of said housing in increments.

4. The tool of claim 2 wherein said barrel comprises: an elongated, cylindrical member.

5. The tool of claim 2 wherein said rod has a threaded bore opening from its said front end; and a threaded element threaded at one end into said threaded bore in said rod and at its other end into said threaded bore through said puller element to thereby attach said puller element to said rod.

6. The tool of claim 1 wherein the rod and the puller are one piece.

7. A kit for modifying a tool so the tool as modified can be used for setting an expansion bolt which is not readily accessible, the expansion bolt being comprised of a central threaded member having an expandable anchor portion on the lower end thereof, the anchor portion having a flange on the upper end thereof, wherein said tool comprises a housing having a front and a back, a rod having a front end and a back end slidably mounted in said housing between said front and said back of housing and a means in said housing for moving said rod towards the back of said housing, said kit comprising:

a puller element that can be attached at one end to said front end of said rod, said puller element being adapted to be releasably attached at its other end to the upper end of the threaded member of the expansion bolt;

a pin adapted for insertion through an opening towards said back of said rod that is behind the housing after the anchor has been set;

a barrel that can be attached to the front end of said housing and extend longitudinally therefrom, said barrel sized to surround the threaded member of the expansion bolt when the threaded member of the bolt is attached to said puller member and said barrel being of a length sufficient to abut the flange of the anchor portion when the expansion bolt is in position to be set and the anchor is not readily accessible; and a face plate attached to said barrel for attaching said barrel to said tool, and wherein said face plate can be removably attached to said front of said housing.

* * * * *